United States Patent Office 3,541,152
Patented Nov. 17, 1970

3,541,152
HEXAHALOHYDROXYISOPROPYL-AROMATIC AMINES
Edward S. Jones, Hanover Township, Morris County, N.J., assignor to Allied Chemical Corporation, New York, N.Y., a corporation of New York
No Drawing. Continuation-in-part of application Ser. No. 329,889, Dec. 11, 1963, now Patent No. 3,405,177. This application Feb. 6, 1968, Ser. No. 703,246
The portion of the term of the patent subsequent to Oct. 8, 1985, has been disclaimed
Int. Cl. C07c 91/40
U.S. Cl. 260—571                                 3 Claims

ABSTRACT OF THE DISCLOSURE

Hexahalohydroxyisopropyl-aromatic amines, useful in the preparation of azo dyestuffs, polyesters, polyamides, insecticides, plasticizers and pharmaceuticals, are produced by reacting aromatic amines with hexahaloacetones in the presence of sulfonic acid catalysts.

---

This is a continuation-in-part of application Ser. No. 329,889, filed Dec. 11, 1963, now U.S. Pat. No. 3,405,177.

This invention relates to hexahalohydroxyisopropyl-aromatic amines useful as intermediates in the preparation of azo dyestuffs, polyesters, polyamides, insecticides, plasticizers and pharmaceuticals.

It is an object of the invention to provide certain new hexahalohydroxyisopropyl-aromatic amines. Other objects and advantages will be apparent from the following description.

I have found that hexahalohydroxyisopropyl-aromatic amines may be prepared by intimately admixing a hexahaloacetone of the formula:

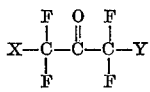

wherein X and Y are halogens selected from the group consisting of chlorine and fluorine, and an aromatic amine of the formula:

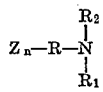

wherein R is an aryl radical selected from the group consisting of phenyl, naphthyl and biphenyl, Z is a member of the group consisting of alkyl, alkoxy and halogen, $R_1$ and $R_2$ are independently selected from the group consisting of hydrogen and alkyl and $n$ is an integer from 0 to 2, in the presence of a sulfonic acid catalyst. The alkyl and alkoxy groups preferably contain from 1 to 6 carbon atoms.

Use of a sulfonic acid catalyst enables preparation of hexahalohydroxyisopropyl-aromatic amine reaction products by a smooth reaction characterized by lower reaction time and temperature and increased yields. Moreover, use of the sulfonic acid catalyst permits certain reactions of aromatic amines with hexahaloacetone compounds which heretofore have been inoperable.

The sulfonic acid catalysts are represented by the formula:

wherein R′ is a radical selected from the group consisting of substituted and nonsubstituted alkyl, aryl and aralkyl radicals. It is to be understood, of course, that sulfuric acid may also be successfully employed. Illustrative examples of aliphatic sulfonic acids include methanesulfonic acid, ethanesulfonic acid, propanesulfonic acid, hexanesulfonic acid, nonanesulfonic acid, 3-chloropentanesulfonic acid, 3,5-dimethylheptanesulfonic acid, dodecanesulfonic acid, and the like. Similarly, aromatic sulfonic acids are illustrated by benzenesulfonic acid, toluenesulfonic acid, xylenesulfonic acid, chlorobenzenesulfonic acid, ethylbenzenesulfonic acid, and the like.

The hexahaloacetones which may be utilized include sym - tetrafluorodichloroacetone, pentafluoromonochloroacetone and hexafluoroacetone. Sym-tetrafluorodichloroacetone is a colorless liquid having a boiling point of about 45° C. whereas pentafluoromonochloroacetate and hexafluoroacetone are colorless gases having boiling points of about 8° C. and −28° C., respectively.

The aromatic amines which may be reacted with these hexahaloacetone compounds and which are illustrated by the above-recited formula include aniline, 2-toluidine, 3-toluidine, 4-toluidine, 2,4-dimethylaniline, 2,5-dimethylaniline, 2,6-dimethylaniline, 2-chloroaniline, 3-chloroaniline, 2-aminobiphenyl, 4-aminobiphenyl, 2-naphthylamine, 2-anisidine, 3-anisidine, 1-naphthylamine, N-methylaniline and N,N-dimethylaniline.

The molar ratio of the reactants is not critical and generally falls in the range from about 0.5 to 2 mols aromatic amine per mol hexahaloacetate. In preferred operation, a substantially equimolar ratio is employed. If the reaction is carried out employing molar ratios less than 0.5 mol aromatic amine per mole hexahaloacetone, the resulting hexahalohydroxyisopropyl-aromatic amine product contains significant contamination due to dialkylation, i.e. a di-substitution of hexahaloacetate on the aromatic ring of the amine reactant. On the other hand, if molar ratios in excess of 2 mols amine reactant per mol hexahaloacetone are employed, difficulty is encountered in recovery of hexahalohydroxyisopropyl-aromatic amine product.

The amount of catalyst employed may vary over a wide range such as 0.1% to 10% by weight based upon the amount of aromatic amine charged. In normal operation, the sulfonic acid catalyst is employed in an amount from about 1 to 4% by weight based upon the amount of aromatic amine charged.

The reaction temperature may vary between 100° C. and the boiling point of the reaction mixture, which usually falls in the range of about 115° to 195° C. It is understood, however, that higher or lower reaction temperature may be employed if the reaction is carried out in the presence of a suitable solvent or under pressure. In preferred operation, reaction temperatures in the range of from about 100° to 180° C. are employed. Use of such preferred temperatures produces hexahalohydroxyisopropyl-aromatic amine product in highest yield and allows for minimum reaction time, i.e. in the order of from about 0.5 to 10 hours.

A solvent may be employed provided it is inert under the conditions of reaction, allows for high or low reaction temperatures and is a solvent for the reactants. Solvents which may be employed include chlorinated hydrocarbons, such as sym-tetrachloroethane and also benzene and its alkylated and halogenated derivatives, such as xylene and chlorobenzene. The amount of solvent is not critical and may be employed in an amount from about 1 part to about 100 parts, and preferably 1 part to 10 parts, per part aromatic amine charged.

The hexahalohydroxyisopropyl-aromatic amines may be recovered from the reaction mixture by employing conventional means. In typical operation, the reaction product may be precipitated out of solution by the addition of a nonsolvent, such as cyclohexane, heptane, hexane, petroleum ether, mixtures thereof and the like, or alternatively, by reducing the solubility of the resulting mixture as by lowering the temperature of the mixture. Isolation of the hexahalohydroxyisopropylaromatic amines may be effected by evaporation of the excess reactants and/or solvent, whenever possible, or by simple filtration followed by drying.

The hexahalohydroxyisopropyl-aromatic amines produced by the above process may be represented by the formula:

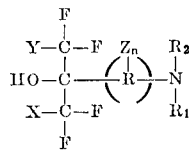

wherein R is an aryl radical selected from the group consisting of phenyl, naphthyl and biphenyl, Z is a member selected from the group consisting of halogen, alkyl and alkoxy, X and Y are halogens selected from the group consisting of chlorine and fluorine, $R_1$ and $R_2$ are independently selected from the group consisting of hydrogen and alkyl and $n$ is an integer from 0 to 2. The alkyl and alkoxy groups preferably contain from 1 to 6 carbon atoms.

The hexahalohydroxyisopropyl moiety easily enters the aromatic ring, usually para to the amino group. If, however, the para position is blocked or there is sufficient steric hinderance, the group is forced into the ortho position.

Of particular interest are hexahalohydroxyisopropyl-aromatic amines which contain a chlorine substituent in the isopropyl moiety as represented by the formula

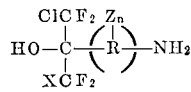

wherein R is an aryl radical selected from the group consisting of phenyl, naphthyl and biphenyl, Z is a member selected from the group consisting of chlorine and alkyl and alkoxy groups having from 1 to 6 carbon atoms, X is a halogen selected from the group consisting of chlorine and fluorine and $n$ is an integer of 1 or 2. The polymeric materials produced therefrom have been found to possess excellent dimensional stability.

Among the specific compounds falling within the above formula are 1-(1,1,1,3-pentafluoro-3-chloro-2-hydroxy-2 - propyl) - 2 - chloro-4-aminobenzene, 1-(1,1,3,3-tetrafluoro - 1,3 - dichloro-2-hydroxy-2-propyl)-4-aminobenzene, 1 - (1,1,3,3 - tetrafluoro-1,3-dichloro-2-hydroxy-2-propyl) - 2 - methyl-4-aminobenzene and 1-(1,1,3,3-tetrafluoro - 1,3 - dichloro-2-hydroxy-2-propyl)-3,5-dimethyl-4-aminobenzene.

Of further particular interest is the hexahalohydroxyisopropyl-aromatic amine derived by reaction of hexafluoroacetone with 2-anisidine. This product has been found to be well suited for making metallizable azo dyestuffs which are especially good for dyeing nylon and other synthetic fabrics.

Other compounds of interest which are derived from hexafluoroacetone include 1 - (hexafluoro - 2 - hydroxy-2-propyl) - 4 - amino-3-phenylbenzene and 1-(hexafluoro-2-hydroxy-2-propyl)-4-amino-3-chlorobenzene.

The following examples are given for the purpose of illustrating the present invention and should not be construed as a limitation thereof. In the examples, parts are by weight.

EXAMPLE 1

Into a reaction vessel, equipped with a stirrer, condenser, thermometer and addition funnel, was charged a reaction mixture comprised of 23.3 parts of aniline and 1.9 parts of p-toluenesulfonic acid, prepared and agitated at room temperature. 55 parts of 1,1,3,3-tetrafluoro-1,3-dichloroacetone were added to the reaction mixture in a dropwise manner, whereupon the temperature increased to 83° C. and was maintained by heating in the range of about 85° C. to 100° C. for a period of 0.75 hour. The reaction mixture was heated at reflux temperature for an additional hour, at which time the pot temperature was 135° C. The reaction mixture was then cooled and hexane, a nonsolvent, was added, whereupon 1 - (1,1,3,3 - tetrafluoro - 1,3 - dichloro - 2 - hydroxy-2-propyl)-4-aminobenzene precipitated out of solution. Recrystallization from ether-hexane solvent yielded 37.1 parts of 1-(1,1,3,3-tetrafluoro-1,3-dichloro-2-hydroxy-2-propyl)-4-aminobenzene having a melting point of 149° C. to 150° C.

EXAMPLE 2

Into the reaction vessel of Example 1, 23.3 parts of aniline were charged followed by heating to a temperature of 130° C. 52 parts of 1,1,3,3-tetrafluoro-1,3-dichloroacetone were added in a dropwise manner over a one-hour period, whereupon the reaction temperature increased to 160° C. and then slowly receded to 100° C. No sulfonic acid catalyst was added. The entire reaction mixture was refluxed until the temperature rose to 160° C. and then was cooled. Only a tarry mass was obtained, and no 1-(1,1,3,3-tetrafluoro-1,3-dichloro-2-hydroxy-2-propyl)-4-aminobenzene product could be isolated or identified.

EXAMPLE 3

The procedure of Example 2 was repeated at an initial temperature of 70° C. and pot temperature of 100° C. No sulfonic acid catalyst was added. Once again, only a tarry mass was obtained.

EXAMPLE 4

35 parts of hexafluoroacetone were introduced over a two-hour period into 25.5 parts of 2-chloroaniline and 0.5 part of p-toluenesulfonic acid heated to a temperature of 170° C. The resulting reaction mixture was cooled and 1-(hexafluoro-2-hydroxy-2-propyl)-3 - chloro - 4 - aminobenzene precipitated out of solution and was isolated by filtration. The crude product was recrystallized from a chloroform-hexane solution to yield 17.5 parts of 1-(hexafluoro-2-hydroxy-2-propyl)-3-chloro-4 - aminobenzene as a solid having a melting point of 121° C. to 123° C.

EXAMPLE 5

The procedure of Example 4 was repeated, except that an extended reaction period of 5 hours was employed, and no sulfonic catalyst was added. No reaction occurred.

EXAMPLE 6

Into 33.8 parts of 2-aminobiphenyl heated to a temperature of 170° C. were introduced 35 parts of hexafluoroacetone and 1.9 parts of p-toluenesulfonic acid as catalyst over a two-hour period. To the resulting reaction mixture was added hexane, whereupon crude 1-(hexafluoro-2-hydroxy-2-propyl)-4-amino - 3 - phenylbenzene precipitated out of solution and was isolated by filtration. Recrystallization from ether-petroleum ether solution yielded 38.4 parts of solid 1-(hexafluoro-2-hydroxy-2-propyl)-4-amino-3-phenylbenzene having a melting point of 141° C. to 144° C.

EXAMPLE 7

The procedure of Example 6 was repeated in the absence of the sulfonic acid catalyst. Only a gummy residue resulted, and no 1-(hexafluoro-2-hydroxy-2-propyl)-4-amino-3-phenylbenzene product was isolated or identified.

EXAMPLE 8

The identical procedure of Example 1 was repeated, with the exception that 26.8 parts of 3-toluidine instead of aniline were employed in the presence of the p-toluenesulfonic acid catalyst. 44.8 parts of 1-(1,1,3,3-tetrafluoro-1,3 - dichloro - 2 - hydroxy-2-propyl)-2-methyl-4-aminobenzene having a melting point of 84 to 85° C. were obtained by recrystallization from an ether-hexane solution.

EXAMPLE 9

The identical procedure of Example 1 was repeated with the exception that 30.3 parts of 2,6-dimethylaniline instead of aniline were employed in the presence of the sulfonic acid catalyst. 53.1 parts of solid 1-(1,1,3,3-tetrafluoro-1,3-dichloro - 2 - hydroxy-2-propyl)-3,5-dimethyl-4-aminobenzene having a melting point of 168° to 170° C. were recovered by recrystallization from an ether-petroleum ether solution.

EXAMPLE 10

The procedure of Example 1 was repeated utilizing an initial temperature of 100° C. and a pot temperature of 130° C., but with the exception that 1 part of methanesulfonic acid was employed as catalyst. After recovery from the reaction mixture and purification by recrystallization, 32.4 parts of 1-(1,1,3,3-tetrafluoro-1,3-dichloro-2-hydroxy-2-propyl)-4-aminobenzene, having a melting point of 149 to 151° C. were obtained.

EXAMPLE 11

The procedure of Example 1 was repeated utilizing an initial temperature of 100° C. and a pot temperature of 140° C., but with the exception that 1 part of 96% by weight sulfuric acid was employed as catalyst. Upon recovery from the crude reaction mixture and purification by recrystallization, 22.1 parts of 1-(1,1,3,3-tetrafluoro-1,3-dichloro-2-hydroxy-2-propyl)-4-aminobenzene having a melting point of 149° to 150.5° C. were obtained.

EXAMPLE 12

A reaction mixture comprised of 40 parts pentafluorochloroacetone, 25.5 parts of 3-chloroaniline and 1 part of p-toluenesulfonic acid was heated to a temperature of 135° C. The temperature increased to 145° C. and was maintained within this range for a period of 2 hours and then cooled by employing external means. The crude product was recovered from the initial reaction mixture and purified by recrystallization from ether-petroleum ether to yield 17.1 parts 1-(1,1,3,3-pentafluoro-3-chloro-2-hydroxy-2-propyl)-2-chloro-4-aminobenzene.

EXAMPLE 13

Into a reaction vessel, equipped with a stirrer, condenser, thermometer and addition funnel, is charged a reaction mixture comprised of 123 parts of 2-anisidine and 3 parts of p-toluenesulfonic acid and the resulting mixture is agitated at room temperature. 166 parts of hexafluoroacetone are added to the reaction mixture in a dropwise manner and the reaction temperature is maintained within a range of about 85° to 100° C. for a period of one hour. The reaction mixture is then heated at reflux temperature for an additional hour. The reaction mixture is cooled by immersion into an ice bath and about 100 parts of hexane, a nonsolvent, is added, whereupon 1 - (hexafluoro - 2 - hydroxy-2-propyl)-3-methoxy-4-aminobenzene is precipitated out of solution. Purification is effected by recrystallization from ether-hexane solvent to yield 1-(hexafluoro-2-hydroxy-2-propyl)-3-methoxy-4-aminobenzene, as a white solid, having a melting point of 129–130° C.

Infrared spectra of the above-prepared hexahalohydroxyisopropyl-aromatic amine compounds were identical to their assigned chemical structures. Generally, the following bands, in microns, were obtained: at 2.85 (OH), 2.93 (NH), 6.25 and 6.65 (aromatic ring) and a broad C–F region at 7.6 to 9.

While the above describes the preferred embodiment of our invention, it will be understood that departures may be made therefrom within the scope of the specification and appended claims.

I claim:

1. A member of the group consisting of (a) a hexahalohydroxyisopropyl-aromatic amine of the formula

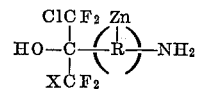

wherein R is phenyl, Z is chlorine or an alkyl group having from 1 to 6 carbon atoms, X is chlorine or fluorine, $n$ is an integer of 1 when Z is chlorine and $n$ is an integer of 1 or 2 when Z is an alkyl group, and (b) 1-(hexafluoro-2-hydroxy-2-propyl)-4-amino-3-phenylbenzene.

2. 1-(1,1,1,3,3 - pentafluoro - 3 - chloro-2-hydroxy-2-propyl)-2-chloro-4-aminobenzene.

3. 1-(hexafluoro - 2 - hydroxy-2-propyl)-4-amino-3-phenylbenzene.

References Cited

UNITED STATES PATENTS 3,236,894   2/1966   England _____ 260—574
3,405,177   10/1968   Jones _____ 260—575

CHARLES B. PARKER, Primary Examiner

C. F. WARREN, Assistant Examiner

U.S. Cl. X.R.

260—575